May 5, 1970  J. S. TART  3,510,003
VERTICAL FILTER APPARATUS
Filed Feb. 8, 1968  3 Sheets-Sheet 1
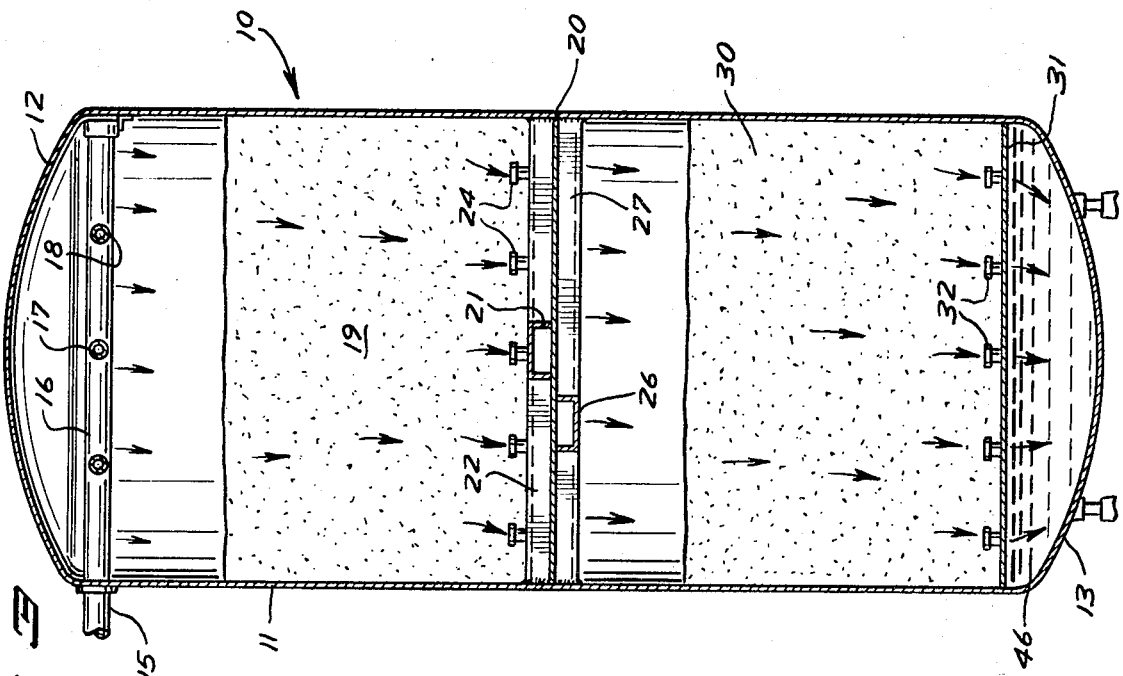
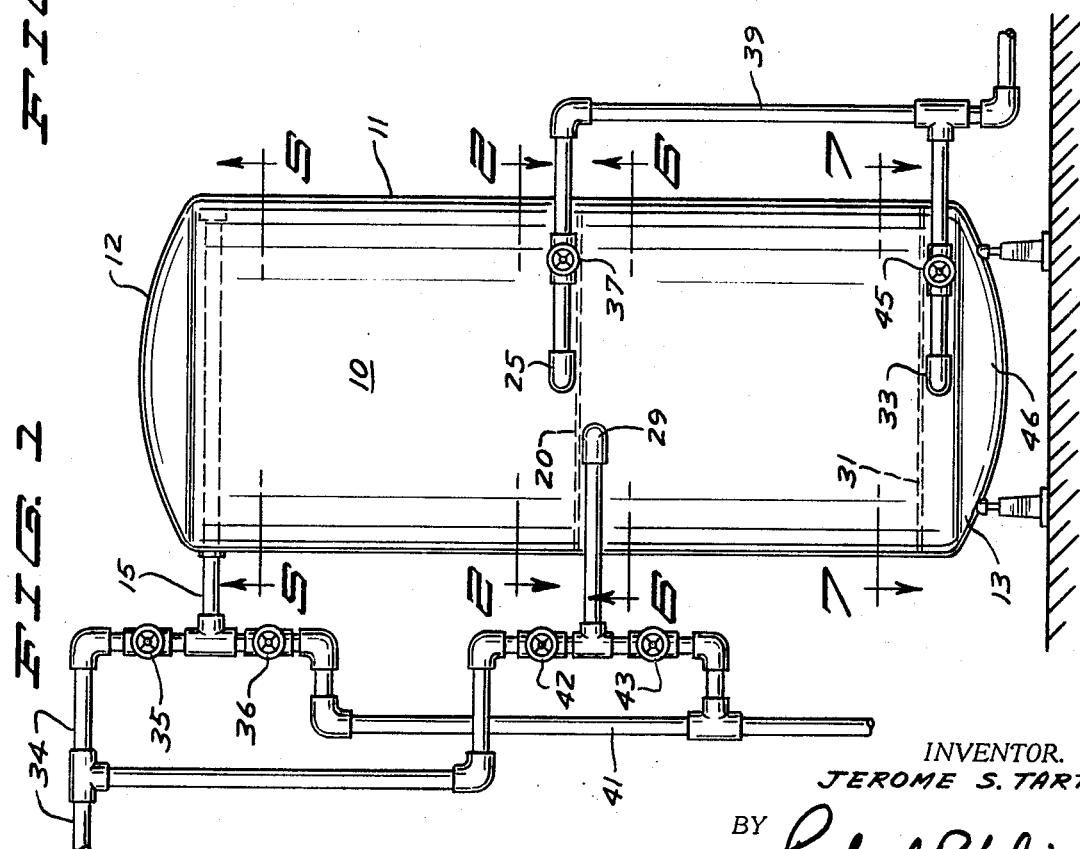
INVENTOR.
JEROME S. TART
BY
Richard P. Ulrich
ATTORNEY May 5, 1970  J. S. TART  3,510,003

VERTICAL FILTER APPARATUS

Filed Feb. 8, 1968  3 Sheets-Sheet 2

INVENTOR.
JEROME S. TART

BY
ATTORNEY

INVENTOR.
JEROME S. TART

United States Patent Office 3,510,003
Patented May 5, 1970

3,510,003
VERTICAL FILTER APPARATUS
Jerome Sheldon Tart, Wayzata, Minn., assignor to Control Data Corporation, Minneapolis, Minn., a corporation of Minnesota
Filed Feb. 8, 1968, Ser. No. 704,103
Int. Cl. B01d 23/10
U.S. Cl. 210—284     1 Claim

ABSTRACT OF THE DISCLOSURE

Vertical fluid filtering apparatus having multiple compartments. The bulkheads separating the compartments providing sufficient structural strength to prevent deformation or rupture when subjected to high differential pressure and also providing the means for collection and distribution of the fluid within the filter compartments when in operation.

---

This invention relates to a new type of vertical fluid filter.

Although the filter requirements of many installations can be met most efficiently and cheaply by a single large filter, such an installation has several defects. Among them is a requirement for a large quantity of backwash fluid and the inability to maintain a supply of filtered fluid while backwashing. The usual solution to these problems is to use a plurality of individual filters or to use a single large filter with a plurality of filter compartments. In the case of individual filters, the solution is cumbersome from a packaging standpoint and is also expensive. In the case of a single large filter having a plurality of compartments, either bulkheads having sufficient strength to withstand the differential pressure likely to be encountered must be provided or some method of pressure equalization must be used. Pressure equalization has been achieved in horizontal filters by the use of a common underdrain or by providing an opening at the top of the partitions capable of passing the full flow of fluid. No method of pressure equalization of which I am aware is used with vertical plural filters. Both horizontal and vertical plural filters have been constructed using standard dished bulkheads. However, this method is just another way of packaging a plurality of separate filters rather than a creation of a single plural filter. Furthermore, the dished shape of the bulkheads reduces the efficiency of operation of the filter bed, a defect which is shared to some extent by horizontal filters because the curvature of the sides of the tank reduces the effective area of the filter bed and causes inefficient backwash flow characteristics. Consequently, it is an object of this invention to provide a bulkhead, other than the standard dished head, which is capable of withstanding the pressure differential usually encountered in filter operation.

It is a further object of this invention to provide a vertical plural filter without the use of dished bulkheads.

It is an additional object of this invention to provide a vertical plural filter in which one compartment can be backflushed while the remaining compartments are in normal filter operation.

Filters generally require means for receiving and distributing fluid over the filter bed and also means for collecting filtered fluid from the filter bed. It is another object to use the improved bulkhead of this invention as fluid distribution means or fluid collection means.

Other objects and advantages will become apparent when the following description and claims are read in conjunction with the drawings.

This is an invention of a new type of filter having a plurality of adjacent compartments, the compartments being formed by structural bulkheads. The structural bulkheads, in turn, not only being structurally sound but also performing the function of fluid distribution and fluid collection.

FIG. 1 is a side elevational view of a plural filter having two compartments, and also showing the collection and distribution piping.

FIG. 3 is a vertical sectional view taken in direction 3—3.

Figure 5:
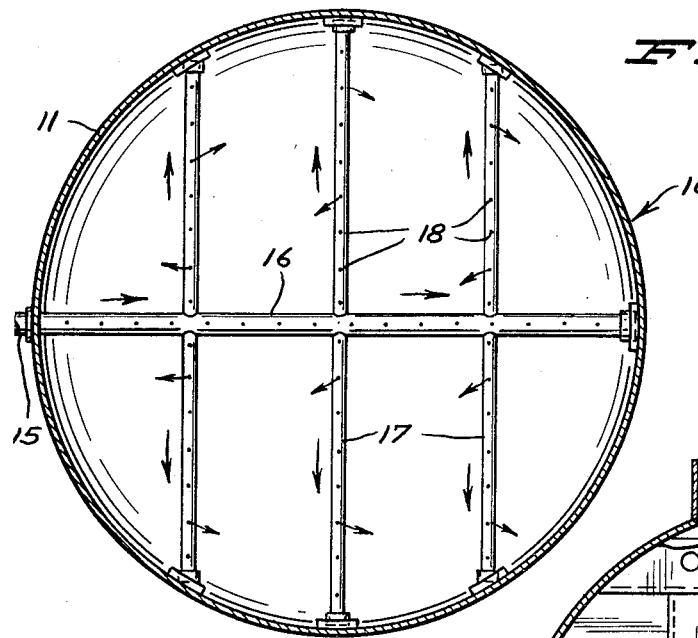
Figure 6:
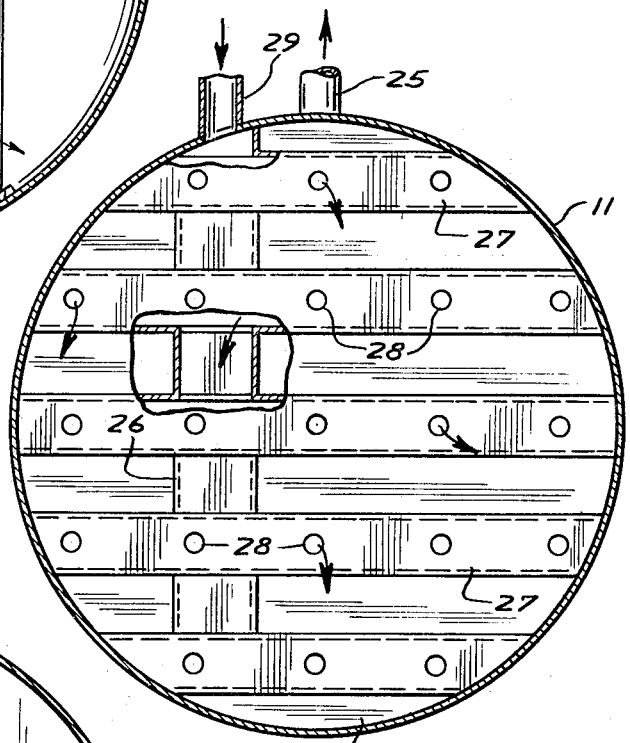
Figure 7:
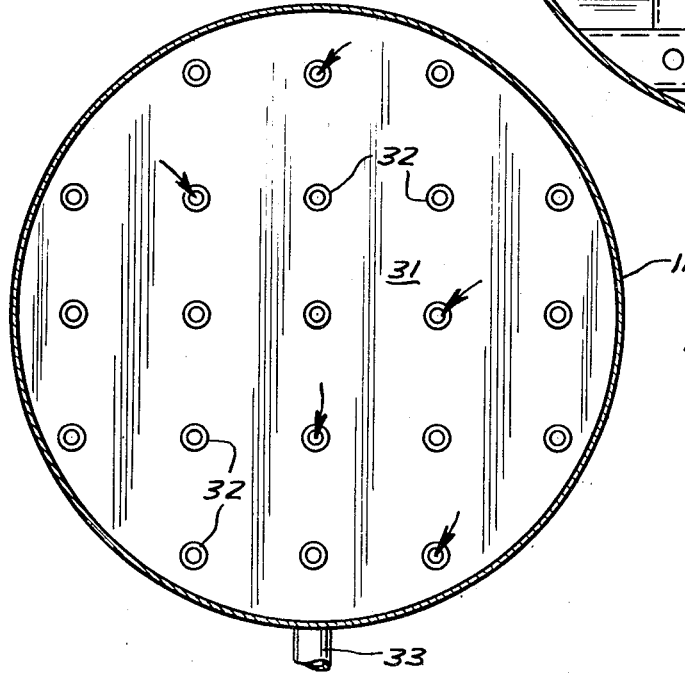

FIG. 5 is a sectional view taken in direction 5—5.
FIG. 6 is a sectional view taken in direction 6—6.
FIG. 7 is a sectional view taken in direction 7—7.

Although the filter illustrated in the drawings has only two compartments, additional compartments could be added merely by adding additional structural bulkheads. Consequently, filters with more than two compartments are within the purview of this invention.

In the drawings, the arrows represent the direction of fluid flow during normal operation. As shown in FIG. 1, the filter is generally designated by the number 10. The exterior of the filter comprises a cylindrical shell 11 to which has been affixed by welding or any other convenient method an upper dished bulkhead 12, and a lower bulkhead 13.

As shown in FIGURE 3, the interior of the filter contains two compartments which are in fact independent filters. Contained in the top of the upper compartment is the upper input distribution means which comprises inlet coupling 15, main distribution pipe 16, and lateral pipes 17. The lateral pipes have a plurality of apertures 18 through which fluid is evenly distributed over filter bed 19. The apertures can be seen best in FIGURE 5. As shown in FIGURE 3, filter bed 19 rests on structural bulkhead 20. The filter bed may be sand or any other suitable filter media. Structural bulkhead 20 comprises the fluid collection system for the upper compartment, and the fluid distribution system for the lower compartment. The fluid colleciton system for the upper compartment comprises a central channel 21, and branch channels 22 (best seen in FIGURE 2) which are attached to plate 23 and shell 11 by welding or other suitable means. Although channels are used in the preferred embodiment, any other elongated member of sufficient structural strength having a concave surface so that conduits can be created between the members and the plate can be used. Branch channels 22 have a plurality of screened apertures 24 through which filtered fluid flows, thereby collecting in branch channels 22 before flowing into central channel 21 and out of outflow means 25.

The fluid distribution system for the lower compartment, as is best shown in FIGURE 6, comprises central channel 26 and branch channels 27 which are attached to plate 23 and shell 11 by welding or other suitable means. As is the case for the fluid collection system of the upper compartment, channels are used in the preferred embodiment, however, any other elongated member of sufficient structural strength having a concave surface so that conduits can be created between the members and plate 23 can be used. Branch channels 27 have a plurality of apertures 28 through which fluid is evenly distributed over filter bed 30 (see FIGURE 3).

Figure 2:
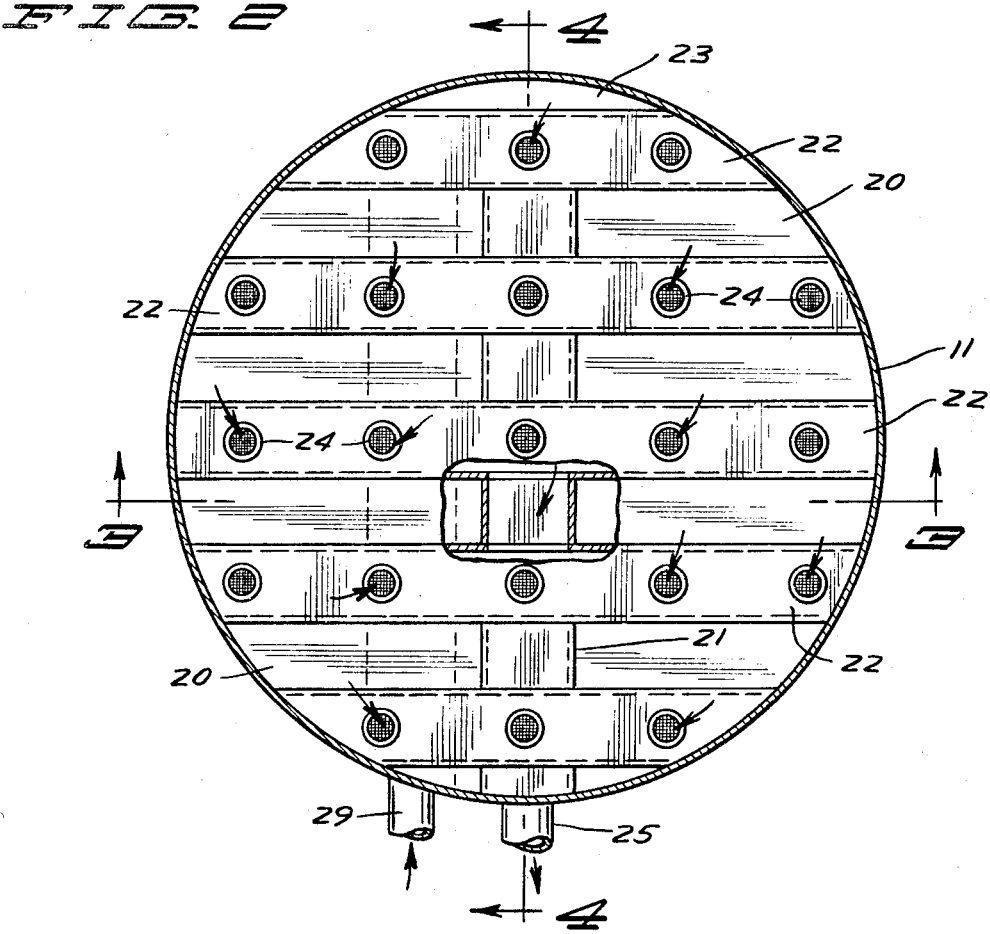
FIG. 2 is a sectional view in the direction of the arrows 2—2 showing the top of the structural bulkhead.
Figure 4:
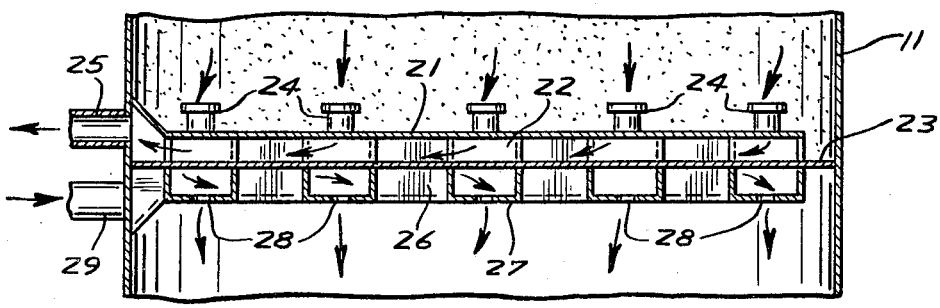
FIG. 4 is a partial vertical sectional view taken in direction 4—4 showing the construction of the collection and distribution means contained within the structural bulkhead.

Examination of FIGURE 4 in conjunction with FIGURES 2 and 6 shows that the distribution system described in conjunction with FIGURE 6 is essentially a mirror image of the collection system for the upper compartment except that central channel 26 is shifted slightly so that inflow means 29 can be easily attached. In addition, apertures 28 in channels 27 are unscreened. Filter media 30 (FIGURE 3) which rests on underdrain plate 31 may be identical to that used in the upper compartment. Underdrain plate 31, which serves as the top of underdrain 46 and has a plurality of screened apertures 32, is attached to shell 11 near the bottom of the lower compartment. Apertures 32 may be identical to apertures 24.

FIGURE 7 shows that the positioning of apertures 32 may be identical to that of apertures 28.

OPERATION

The operation of the filter will be described in conjunction with FIGURES 1 and 3. When the upper compartment is in filter operation, valve 36 is closed and valves 35 and 37 are open. The water or other fluid flows through piping means 34, open valve 35, through inlet coupling 15 into main distribution pipe 16, through apertures 18 in lateral pipes 17, through filter bed 19, where impurities are removed, through apertures 24 into branch channels 22, into central chanel 21, and out to storage or to the fluid supply via outlet means 25, valve 37, and piping means 39.

When in back-flush operation, valve 35 is closed while valves 36 and 37 are open. The water or fluid flows through piping means 39 from another filter (for example, the lower compartment), through valve 37, through upper tank collection means, the filter bed, upper tank distribution piping, valve 36, piping 41 and to waste.

Operation of the lower compartment is so similar to the operation of the upper compartment that it is not described except to point out that when in filter operation, valves 42 and 45 are open while valve 43 is closed, and when in backflush operation, valve 43 and valve 45 are open while valve 42 is closed.

From the above description of operation, it is apparent that each compartment of the filter is essentially a separate independent filter. That is to say, either compartment may be removed from operation by closing valve 37 or 45 without interfering with the function of the other compartment. Furthermore, structural bulkhead 20 may be subjected to a high differential pressure. This high differential pressure may occur, for example, when one compartment is connected to waste during backflushing while the other is connected for normal filtration, or when one compartment is shut down for inspection or maintenance, while the other is in operation. During a maintenance shut-down of the lower compartment, valves 42 and 45 would be closed and 43 open.

It will be apparent from the foregoing to those skilled in the art that this invention is amendable to a variety of modifications and hence may be given embodiments other than the embodiments particularly illustrated and described herein without departing from the essential features of the present invention and within the scope of the claims appended hereto.

What is claimed is:
1. A filter comprising:
    (a) a cylindrical tank having an inlet end and an outlet end;
    (b) a first plate affixed to the inside surface of the tank near the outlet end, the first plate having a plurality of apertures for the passage of fluid, the space between the first plate and the outlet end providing a first underdrain;
    (c) at least one second plate attached to the inside surface of the tank between the first plate and the inlet end of the tank thereby dividing the space between the first plate and the inlet end of the tank into at least a first compartment and a second compartment;
    (d) a first plurality of channels rigidly welded to the second plate and to the tank within the first compartment, the chanenls forming a second underdrain having a plurality of passageways through which fluid may flow and having a plurality of apertures, the apertures providing means for transfer of fluid between the passageways into the first compartment;
    (e) means for removing fluid from the second underdrain;
    (f) input distribution means for supplying fluid to the first compartment;
    (g) a second plurality of channels rigidly welded to the second plate and to the tank within the second compartment, providing in combination with the first plurality of channels a structural bulkhead, the second plurality of channels also forming a plurality of passageways through which fluid may flow and having a plurality of apertures, the apertures providing means for transfer of fluid between the passageways and the second compartment, the structural bulkhead providing means for withstanding high differential pressure; filter means in said first and second compartments;
    (h) means for supplying fluid to the second plurality of channels; and
    (i) means for removing fluid from the first underdrain.

References Cited

UNITED STATES PATENTS

| Re. 17,621 | 3/1930 | Kenney | 210—284 X |
| 651,173 | 6/1900 | Weaver | 210—289 X |
| 1,276,665 | 8/1918 | Leopold | 210—292 |
| 3,202,286 | 8/1965 | Smit | 210—286 |

SAMIH N. ZAHARNA, Primary Examiner